United States Patent [19]

Culling

[11] Patent Number: 5,036,598
[45] Date of Patent: Aug. 6, 1991

[54] DISTANCE MEASURING DEVICE

[76] Inventor: Robert K. Culling, 570 Lockport, Rochester Hills, Mich. 48063

[21] Appl. No.: 648,463

[22] Filed: Jan. 30, 1991

[51] Int. Cl.⁵ .............................................. G01B 3/12
[52] U.S. Cl. ........................................ 33/776; 33/782
[58] Field of Search ................. 33/772, 776, 779, 782; 377/24.2

[56] References Cited

U.S. PATENT DOCUMENTS 2,484,151  10/1949  Brownell .
2,806,291  9/1957  Robertson ............................ 33/776
4,858,328  8/1989  Heinen ................................. 33/779

Primary Examiner—William A. Cuchlinski, Jr.
Assistant Examiner—Alvin Wirthlin
Attorney, Agent, or Firm—Peter A. Taucher; Gail S. Soderling

[57] ABSTRACT

A distance measuring device includes first and second wheels having an endless belt looped about the wheels so the belt rotates as a ground engaging wheel. A hand contacting member is attached to the belt so as to provide positive sensory input to the device user when measuring distances.

2 Claims, 1 Drawing Sheet

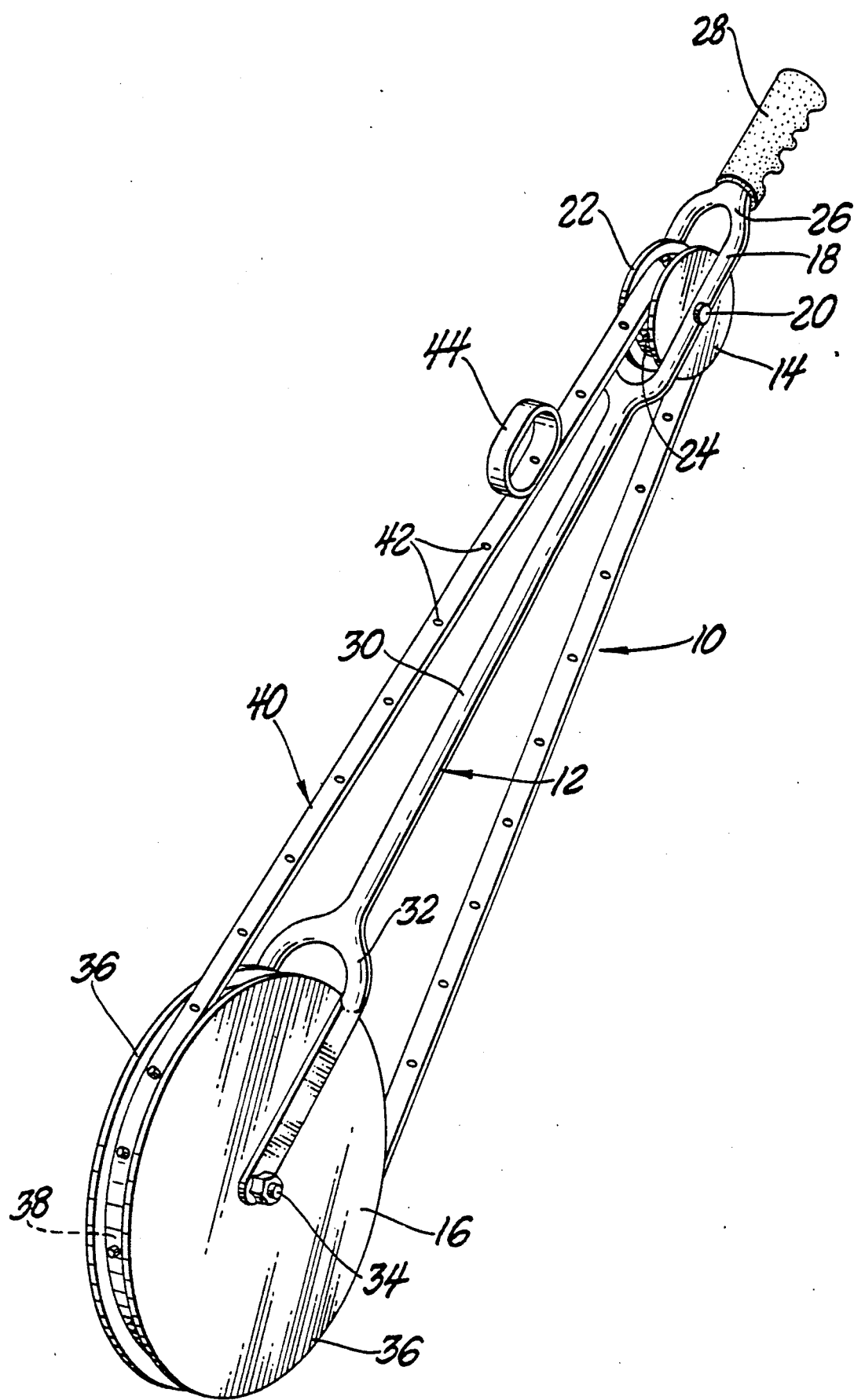

DISTANCE MEASURING DEVICE

GOVERNMENT INTEREST

The invention described herein may be manufactured, used, and licensed by or for the Government for governmental purposes without payment to me of any royalty thereon.

BACKGROUND OF THE INVENTION

1. Field of the Invention

On one aspect this invention relates to devices for measuring distances. In another aspect, this invention relates to a device adapted to be moved by a person on foot to measure distances over land.

2. Prior Art

Distance measuring devices comprising a wheel with a known circumference mounted on a handle are known in the art. Such systems have a counter mounted to the axle of the wheel to measure the number of revolutions and convert the revolutions to feet.

These devices are useful over normal flat surfaces or terrain such as that found in cities. However, they are not well adapted for use in less developed areas, they require visual inspection of the counter, and the counting mechanism tends to be unreliable and noisy.

There is a need for a quiet distance measuring device which can be used by the foot soldier to measure distances, which does not make noise to indicate the soldier's presence and which will provide a tactile stimulus in use so a soldier knows the distance traveled without the need to read a gage or dial. Also the device should operate in undeveloped terrain without having the measuring wheel slide or the counter mechanism slip.

BRIEF SUMMARY OF THE INVENTION

The present invention discloses a distance measuring device with a frame having a handle and adapted to hold first and second wheels in a spaced relationship. Each wheel is mounted in the frame so as to freely rotate. An endless flexible belt is mounted on the first and second wheels, the flexible belt being constructed so it will rotate when one of the wheels is rotated. A hand contacting projection is attached to the flexible belt at a position where the projection will contact the hand of a user of the device who is holding the handle once each time the belt revolves.

BRIEF DESCRIPTION OF THE DRAWING

In the accompanying drawing; the FIGURE is an isometric projection of one embodiment of this invention.

DETAILED DESCRIPTION OF THE PREFERRED EMBODIMENTS

The accompanying drawing discloses one preferred embodiment of an invention formed in accordance with this invention. A distance measuring device of this invention is designated generally 10. The basic structure of the distance measuring device 10 comprises a frame 12 which is adapted to hold a first relatively smaller wheel 14 and a second relatively larger ground engaging wheel 16.

The first, smaller wheel 14, is mounted within a first yoke 18 on a first axle 20. The first, smaller wheel 14 has flanges 22 located on each end of a toothed drum 24 to form a pulley type structure. The first smaller wheel has a handle 26 located nearby for reasons which will be discussed later. As shown, the handle 26 is a Y-shaped structure with the legs being a continuation of the first yoke 18 to form a structure which encompasses the first smaller wheel 14 and has a shaped handgrip 28 adapted to be held by the person who is operating the distance measuring device 10 located so the user's hand will be kept in close proximity to the first smaller wheel 14.

The frame member 12 has a shaft 30 extending from the first yoke 18, the end of the shaft distal the first yoke terminating in a second yoke 32. The second yoke 32 serves as the mounting for the second, larger, ground engaging wheel 16. The second ground engaging wheel 16 is mounted on a second axle 34 for free rotation. The second ground engaging wheel 34 has a pair of spaced flanges 36 which are located on either side of a toothed drum 38 to also form a pulley like structure. The flanges of the first smaller wheel 14 and the second ground engaging wheel 16 cooperate to define a channel with the toothed drum serving as the bottom of the channel, adapted to receive a power transmitting belt.

The power transmitting belt shown is a flexible belt 40 having a plurality of apertures 42 formed into an endless loop which lies in the channel formed by the flanges of the first and second wheels. The spacing of the teeth on the toothed drum 24 and the second toothed drum 38 correspond with the apertures 42 in the flexible belt 40 so rotation of the ground engaging wheel causes movement of the belt. The flexible belt 40 has a soft hand contacting projection 44 which is shown as a loop but could take other forms. The projection 44 is adapted to gently contact the hand of the user on the handle 26 as the flexible belt 40 rotates to provide a tactile stimulation. By properly dimensioning the measuring device, it is possible to make each revolution of the belt indicate a standard unit, i.e., 10 feet.

When used, the measuring device of this invention is gripped by the handle 26, the ground engaging wheel 16 positioned and the device moved forward. Each time the loop contacts the user's hand they can add another increment to the total distance traversed. Because there are no counters the device is essentially silent. Also because the device provides a tactile stimulus on a continuous basis the user has a running indication of the distance traversed. This is true even though it is dark since the user need not read a counter. Thus a military person can move the measuring device to measure distances or use it to measure the distance to a particular location. Because of its construction the device is simple to operate and trouble free.

As shown the handle has a rigid shaft 30 but the handle can be made so it collapses to make storage and transportation easier.

The choice of part sizes to achieve the desired distance represented by one belt revolution, is within the skill of the art. One example might be for a 10 foot loop. If the first smaller wheel has a drum diameter of about 2.6 inches and the larger ground engaging wheel has a drum diameter of about 11 inches and the outer diameter of the ground engaging wheel is about 13.3 inches the distance between the axles will be about 38.4 inches. This makes the over all length of the device about 48 to 50 inches including the handle. The resulting measuring device is appropriately sized for use by the average person.

I wish it to be understood that I do not desire to be limited to the exact details of construction shown and described for obvious modifications will occur to a person skilled in the art, without departing from the spirit and scope of the appended claims.

What is claimed is:

1. A distance measuring device comprising: a frame adapted to hold first and second wheels in a spaced relationship, the wheels being freely rotatable and having a toothed portion, a handle located juxtaposed to the first wheel to hold and manipulate the measuring device, an endless flexible belt mounted on first and second wheels, the flexible belt having a plurality of evenly spaced perforations adapted to engage the toothed portion on the first and second wheels, and at least one hand contacting projection attached to the flexible belt at a position where the flexible belt will contact the hand of a user holding the handle as the device is operated to rotate the flexible belt.

2. A distance measuring device comprising: a shaft having a first yoke with a first small toothed wheel mounted on an axle in the yoke, said first wheel having a flange on each side of a toothed drum and being freely rotatable within the yoke, a second yoke mounted on the end of the shaft distal the first yoke, a second large ground engaging toothed wheel mounted on a second axle within the second yoke, said second wheel having a flange on each side of a second toothed drum, the flanges forming a channel therebetween with the toothed drum serving as the bottom of the channel, a handle located juxtaposed to the first yoke to provide means to hold and manipulate the distance measuring device, endless flexible belt mounted on the first and second wheels, the flexible belt having a plurality of evenly spaced perforations adapted to engage the teeth on the first and second drums, the flanges acting to hold the flexible belt on the drums and preventing said belt from slipping off the drums and also protecting the belt from abrasive forces, a soft flexible projection contacting the hand of a user holding said handle once each revolution of the flexible belt as the second ground engaging wheel of the device is moved along the ground.

* * * * *